United States Patent [19]

Huybrechts et al.

[11] Patent Number: 4,564,648

[45] Date of Patent: Jan. 14, 1986

[54] EPOXY GRAFT ACRYLIC WATER-BASED PRIMER SURFACES

[75] Inventors: Jozef T. Huybrechts, Turnhout; Victor R. Vleminckx, Schelle, both of Belgium

[73] Assignee: E. I. Du Pont de Nemours and Company, Wilmington, Del.

[21] Appl. No.: 652,858

[22] Filed: Sep. 21, 1984

[51] Int. Cl.$^4$ ................................................ C08L 63/10
[52] U.S. Cl. ............................ 523/423; 523/407; 523/414; 523/416; 523/417; 525/404; 528/112; 528/113
[58] Field of Search .............. 523/407, 414, 416, 417, 523/423; 525/404; 528/112, 113

[56] References Cited

U.S. PATENT DOCUMENTS

| | | | |
|---|---|---|---|
| 4,076,675 | 2/1978 | Sommerfeld | 523/416 |
| 4,285,847 | 8/1981 | Ting | 525/63 |
| 4,302,373 | 11/1981 | Steinmetz | 524/901 |
| 4,308,185 | 12/1981 | Evans et al. | 523/423 |
| 4,444,806 | 4/1984 | Morgan et al. | 427/45.1 |
| 4,444,923 | 4/1984 | McCarty | 523/407 |
| 4,446,258 | 5/1984 | Chu et al. | 523/409 |
| 4,446,260 | 5/1984 | Woods et al. | 427/239 |
| 4,482,671 | 11/1984 | Woo et al. | 523/407 |

FOREIGN PATENT DOCUMENTS

EP60581  9/1982  European Pat. Off. ............ 523/402

*Primary Examiner*—Ronald W. Griffin

[57] ABSTRACT

Dispersion of an epoxy ester graft acrylic in water with a total of no more than 5% of organic volatiles and amines. These dispersions can be used in primer compositions for metal substrates having a minimum of organic solvent emissions and which can crosslink at temperatures from 110°–200° C., giving a good balance of hardness, flexibility, humidity, corrosion resistance and anti-chipping properties.

14 Claims, No Drawings

EPOXY GRAFT ACRYLIC WATER-BASED PRIMER SURFACES

BACKGROUND

This invention relates to epoxy ester polymers having acrylic portions grafted thereto. More particularly, it relates to coating compositions containing such polymers.

U.S. Pat. No. 4,302,373—Steinmetz (Nov. 24, 1981) describes water-borne coating compositions of epoxy resin, polymeric acid and tertiary amine, wherein the epoxy functionality is partially capped with a carboxylic acid polymer to form a hydrogel. Coating compositions made therefrom are taught for use in can coatings and for automotive and paper coatings.

An acetic acid-neutralized aqueous polyaminoamido resin made using dimeric fatty acids is disclosed in European Patent Application Publication No. 60581 of Sept. 22, 1982—Guenter et al (Akzo).

Other aqueous epoxy coating compositions also outside the present invention are disclosed in U.S. Pat. Nos. 4,446,258 of May 1, 1984—Chu et al (Mobil Oil), 4,446,260 of May 1, 1984—Woods et al (International Paint), and 4,444,806 of Apr. 24, 1984—Morgan et al (W. R. Grace).

SUMMARY OF THE INVENTION

The present invention provides a dispersion in water, in precentages by weight based on the total dispersion, of:
(a) 10–60% of an epoxy ester graft acrylic polymer formed by reacting 5–30% of an epoxy ester polymer formed by reaction of n moles of a difunctional epoxy resin with terminal oxirane groups and a number average molecular weight ($\overline{Mn}$) of 300–5000, n−1 moles of a diacid, and 2 moles of a monofunctional acid to form a reaction product, onto which is grafted 5–30% of an acrylic monomer by using a peroxide or azo initiator, to produce said epoxy ester acrylic polymer with a $\overline{Mn}$=1000–50,000 and an acid number of 30–150,
(b) amines being added to an extent equivalent to neutralizing 50–200% of the moles of acid functionality,
(c) organic solvents,
   such dispersion having not more than 10% volatile organic solvents plus amines, and
(d) balance water.

The epoxy ester graft acrylic polymers of (a) above, and methods of making them, are different aspects of the invention.

DETAILED DESCRIPTION

The present invention is made possible by a new method of synthesis of an epoxy ester graft acrylic polymer. The process involves the synthesis of a liner epoxy ester formed by reaction at 80°–190° C. of an oxirane terminated bisphenol A epoxy resin with aliphatic diacids and monoacids in approximately stoichiometric proportions so that all the oxirane groups and acid groups have reacted. The reaction is done in a minimum amount of an organic solvent, preferably aromatic for ease of stripping, preferably using a small percentage of a tertiary amine as catalyst. In a second stage an acid functional acrylic is grafted onto the epoxy ester using a peroxide or azo initiator. Grafting onto the epoxy ester is believed to go via hydrogen abstraction of acitvited carbon-hydrogen bonds. In a third stage the acid functionality on the epoxy ester is neutralized with an amine (50–200% neutralization), the polymer is dispersed in deionized water the excess organic solvents are distilled off.

These epoxy ester-acrylic dispersions then contain a minimum of organic solvents, so as to be able to formulate primer compositions, preferably with no more than 5% organic volatiles.

When combined with water soluble or dispersible crosslinkers, like hexamethoxymethylmelamine, pigments and extenders, primer surfacers can be formulated which show good corrosion resistance over bare steel, an excellent balance of hardness, flexibility, antichipping properties, good topcoat hold-out and appearance.

These primer surfacers can be baked for 30 min at from 110° C. to 200° C., still retaining their basic properties. The primers can be applied by conventional or electrostatic spraying. To further improvve application and flow properties, rheology control agents and flow agents can be used. Silica or clay pastes are quite successful for rheology control to prevent pinholing and sagging, and water soluble or dispersable linear or branched polyethylene glycols or polypropyleneglycols are efficient for flow properties. The primer surfacers show excellent initial and wet adhesion over bare steel and cathodic electrode-posited primers. Adhesion and hold-out of conventional topcoats (polyester, alkyd, acrylic) is very good over broad temperature ranges. Hold-out is the resistance to interpenetration at the interface between the layers of primer surfacer and topcoat applied in organic solvents.

The following are examples describing manufacture of epoxy ester graft acrylic dispersions. Parts, proportions and percentages are by weight except where indicated otherwise.

EXAMPLE 1

| Ingredient | Parts | Producer |
| --- | --- | --- |
| Xylene | 2.73 | |
| Pripol 1014 dimerized fatty acid (Pri) | 2.80 | Unichema |
| Epon 1001 epoxy resin | 9.62 | Shell |
| Dimethylolpropionic acid (DMPA) | 1.304 | |
| Dimethylcyclohexylamine (DMCA) | 0.032 | |
| Heat at reflux for 3 hours until acid number (AN) is below 3. | | |
| Xylene | 1.00 | |
| Heat at reflux 150–155° C. while adding over 30 min keeping the exotherm under control. | | |
| Styrene (S) | 2.194 | |
| Methylmethacrylate (MMA) | 2.572 | |
| Butylacrylate (BA) | 5.039 | |
| Hydroxyethylacrylate (HEA) | 0.718 | |
| Acrylic acid (AA) | 0.824 | |
| Trigonox C tert-butylperoxy-benzoate (BPB) | 0.128 | Akzo |
| Xylene | 0.583 | |
| Mercaptoethanol | 0.200 | |
| Add over 30 min, hold 10 min. | | |
| Xylene | 1.747 | |
| S | 2.95 | |
| MMA | 2.572 | |
| BA | 1.137 | |
| HEA | 0.93 | |
| AA | 1.648 | |
| BPB | 0.384 | |
| Mercaptoethanol | 0.60 | |
| Add over 90 min, hold 2 hours. Cool down to 90° C. | | |
| Dimethylethanolamine (DMEA) | 3.113 | |
| Deionized water (DW) | 0.911 | |

-continued

| | |
|---|---|
| | Add - mix 15 min. |
| DW | 10.06 |
| | Add and heat at reflux, about 100° C. |
| DW | 49.89 |
| | Add slowly while distilling off all organics insoluble in DW at reflux. |
| Test results: | solids 37% (measured 2 hours at 125° C.) Brookfield viscosity measured at 20 RPM 9800 centipoises (cps) = 9800 milliPascal seconds (mPas) pH 7.75 |

EXAMPLE 2

| Ingredient | Parts | |
|---|---|---|
| Epon 1001 | 6.59 | |
| Pri | 19.17 | |
| DMPA | 0.893 | |
| DMCA | 0.023 | |
| Cellosolve acetate | 0.577 | |
| Xylene | 0.60 | |
| Heat at 150–160° C. until AN below 3. | | |
| Xylene | 1 | |
| Add and bring to reflux | | |
| S | 3.525 | |
| MMA | 3.525 | |
| BA | 4.23 | |
| HEA | 1.128 | |
| AA | 1.692 | |
| BPB | 0.35 | |
| Mercaptoethanol | 0.55 | |
| Xylene | 0.80 | |
| Add over 2 hours. Reflux 2 hours. | | |
| DMEA | 1.269 | |
| DW | 1.731 | |
| Add. Mix 15 min. | | |
| DW | 33.519 | |
| Add 30%, mix, then add remaining 70% while stripping off organics insoluble in DW. | | |
| Test results: | solids | 32% |
| | visc. | 8000 mPas |
| | pH | 8.1 |

EXAMPLE 3

| | | |
|---|---|---|
| Xylene | 1.74 | |
| Epon 828 epoxy resin | 6.13 | Shell |
| Pri | 5.18 | |
| DMPA | 2.414 | |
| DMCA | 0.032 | |
| Heat at reflux until AN ≦ 3. | | |
| Xylene | 0.50 | |
| Heat at reflux | | |
| S | 2.792 | |
| MMA | 2.572 | |
| BA | 5.039 | |
| HEA | 0.718 | |
| AA | 0.824 | |
| BPB | 0.128 | |
| Xylene | 0.683 | |
| Mercaptoethanol | 0.100 | |
| Add over 30 min, hold 10 min. | | |
| Xylene | 1.747 | |
| S | 2.95 | |
| MMA | 2.572 | |
| BA | 1.137 | |
| HEA | 0.930 | |
| AA | 1.648 | |
| BPB | 0.384 | |
| Mercaptoethanol | 0.300 | |
| Add over 90 min, hold 2 hours. | | |
| DMEA | 3.113 | |
| DW | 0.911 | |
| Add, mix 15 min. | | |
| DW | 10.06 | |

-continued

| | | |
|---|---|---|
| Add and strip off organic volatiles, then add: | | |
| DW | 49.89 | |
| Test results: | solids | 30.5 |
| | pH | 7.8 |
| | visc. | 9400 cps |

EXAMPLE 4

| | | |
|---|---|---|
| Xylene | 2.75 | |
| Pri | 2.80 | |
| Epon 1001 | 9.62 | |
| DMPA | 1.304 | |
| DMCA | 0.032 | |
| Heat at reflux for 3 hours until AN ≦ 3. | | |
| 2 Ethylhexanol | 8 | |
| S | 1.235 | |
| BA | 5.311 | |
| AA | 0.988 | |
| HEA | 0.618 | |
| Methanol | 1.30 | |
| Add and heat at reflux ± 100° C. | | |
| Lucidol benzoylperoxide | 0.07 | AKZO |
| MMA | 3.952 | |
| Mercaptoethanol | 0.05 | |
| 2-ethylhexanol | 0.70 | |
| Add, hold 10 min. | | |
| MMA | 4.694 | |
| S | 0.824 | |
| BA | 0.865 | |
| HEA | 0.617 | |
| AA | 1.482 | |
| Benzoylperoxide | 0.35 | |
| Add 30% over 15 min. | | |
| Add 45% over 50 min. | | |
| Add 25% over 80 min. | | |
| Hold 30 min. | | |
| DMEA | 3.053 | |
| Add, mix 15 min. | | |
| DW | 65.69 | |
| Add while stripping off organics insoluble in DW. | | |
| Test results: | solids | 32.1% |
| | visc. | 800 cps mPas |
| | pH | 7.8 |

Following are examples describing manufacture of primer surfacer paints or finishes with a content of organic volatiles of no more than 5%.

Following are examples describing manufacture of finishes paints, application and properties:

EXAMPLE 5

| | | |
|---|---|---|
| Resin dispersion of Example 2 | 60.93 | |
| DW | 6.08 | |
| DMEA | 0.29 | |
| Surfynol 104 E anti-form/anti-cratering agent | 1.84 | Air Products |
| Pluriol P 900 polypropylene oxide mol. wt. 900 (reactive diluent) | 2.26 | BASF |
| Cymel 303 hexamethoxymethylmelamine | 4.20 | Cyanamid |
| Aerosil 200 fumed silica | 0.87 | Degussa |
| Blanc Fixe barium sulfate | 10.13 | Sachtleben |
| Aluminum silicate | 2.56 | |
| Titanium dioxide pigment | 6.73 | |
| Carbon black | 0.034 | |
| Iron oxide | 0.145 | |
| Deionized water | 3.941 | |
| | 100.000 | |

Pigment to binder ratio (P/B) = 74.3/100
Binder ratio: 76.5/15.3/8.2:Resin of Example 2/Cymel 303/Pluriol P 900.

The above mixture is ground to a fineness smaller than 15 μm. Next there is added deionized water to obtain a package viscosity of 100 to 150 sec DIN cup 4 at 20° C.

EXAMPLE 6

The procedure of Example 5 was repeated with the exception that the resin dispersion of Example 2 was replaced by resin of Example 1.

EXAMPLE 7

The procedure of Example 5 was repeated with the exception that the melamine resin Cymel 303 was replaced by Cymel 350, another melamine resin.

EXAMPLE 8

The procedure of Example 5 was repeated with the exception that the dimethylethanolamine was replaced by DMAMP 80 (2-dimethylamino-2-methyl-1-propanol) from IMC Co.

EXAMPLE 9

The procedure of Example 5 was repeated with the exception that reactive diluent Pluriol P 900 (polypropylene oxide, molecular weight 900) was replaced by Luphen 1320 from BASF (branched polyethyleneglycol).

EXAMPLE 10

The procedure of Example 5 was repeated with the exception that Aerosil 200 was replaced by Bentone EW bentonite clay from NL Chemicals.

EXAMPLE 11

The procedure of Example 5 was repeated with the exception that the P:B ratio was changed from 74.3/100 to 50/100.

PANEL PREPARATION

The products of Examples 5-11 were reduced with deionized water to a spray viscosity of 20 seconds DIN cup 4 at 20° C. The coating composition obtained was sprayed over a cataphoretic electrocoated panel at a thickness of 35 μm dry film thickness and cured at a temperature of 170° C. for 25 minutes.

The obtained primer film was coated with different topcoats including alkyd/melamine/acrylic/melamine color coat—clear coat resulting in excellent adhesion gloss, flow and DOI. Test results on the coating properties are given in Table I in terms of:
Buckholz hardness: DIN 53153
Erichson flexibility: DIN 53156
Salt spray: DIN 50021. The rust creepage from the scribeline is measured in mm.

All Examples were submitted to the humidity cabinet according to DIN 50017 for 240 hours over bare steel and 480 lhours over electrocoated panels. In neither of the tests did any blistering occur. Good chip resistance was also observed.

TABLE I

| Example No. | Buchholz Hardness | Erichson Flexibility | Salt spray over electrocated panel 500 hrs | Salt spray over bare steel 144 hrs |
|---|---|---|---|---|
| 5 | 98.0 | 5.9 mm | 0 mm | 3 mm |
| 6 | 85.0 | 6.5 mm | 0 mm | 5 mm |
| 7 | 133.0 | 4.4 mm | 0 mm | 7 mm |
| 8 | 100.0 | 5.4 mm | 0 mm | 6 mm |
| 9 | 107.0 | 5.5 mm | 0 mm | 2 mm |
| 10 | 100.0 | 5.2 mm | 0 mm | 4 mm |
| 11 | 92.0 | 6.5 mm | 0 mm | 4 mm |

We claim:
1. A dispersion in water of:
   (a) 10–60% of an epoxy ester graft acrylic polymer formed by reacting 5–30% of an epoxy ester polymer formed by reaction of n moles of a difunctional epoxy resin with terminal oxirane groups and a number average molecular weight ($\overline{Mn}$) of 300–5,000, n−1 moles of a diacid, and 2 moles of a monofunctional acid to form a reaction product, onto which is grafted 5–30% of an acrylic monomer by using a peroxide or azo initiator, to produce said epoxy ester acrylic polymer with a $\overline{Mn}$=1000–50,000 and an acid number of 30–150,
   (b) amines being added to an extent equivalent to neutralizing 50–200% of the moles of acid functionality,
   (c) organic solvents,
   such dispersion having not more than 10% volatile organic solvents plus amines, and
   (d) balance water.

2. The dispersion of claim 1 with 5–20% epoxy ester and 10–30% of an acrylic with acid number 60–140 in 50–80% deionized water, having been azeotropically distilled to leave not more than 5% organic volatiles.

3. The dispersion of claim 1 with the epoxy ester formed by reaction of n moles of a difunctional bisphenol A-based epoxy with $\overline{Mn}$=300–2000, n−1 moles an aliphatic-based difunctional acid with a total of 4–40 carbon atoms and 2 moles of monofunctional acid having 2–25 carbon atoms.

4. The dispersion of claim 1 with the acrylic graft formed by reaction of alkyl acrylate, alkyl methacrylate, styrene, hydroxyfunctional acrylates and/or methacrylates, acid functional acrylates and/or methacrylates, alkylmaleates and/or fumarates, using 0.01–10% by weight of initiator based on the acrylic content, at 60° 180° C., with the acrylic having an acid number of 40–120.

5. The dispersion of claim 1 with the epoxy ester-graft acrylic having been neutralized with a tertiary amine which has a boiling point of 60°–220° C.

6. The dispersion of claim 1 containing 0–10% of a water soluble organic solvent.

7. The dispersion of claim 1 of which at least 5–15% is epoxy ester, 5–15% is acrylic graft, up to 5% is neutralizing amine plug organic solvent, and 60–80% is deionized water.

8. The dispersion of claim 1 with the epoxy ester and acrylic graft being formed in an aromatic solvent, neutralizing with the amine and the aromatic solvent distilling off.

9. The coating composition comprising
   (a) 10–40% of the expoxy ester graft acrylic polymer described in claim 1, including up to 5% neutralizing amines plus organic solvents, and 30–80% of deionized water,
   (b) 0–40% of pigments and extenders,
   (c) 0–20% of additives and/or reactive diluents, and (d) 0-30% of a water soluble or dispersable crosslinker.

10. The coating composition of claim 9 wherein the epoxy ester graft acrylic polymer has at least 5-15% epoxy ester, 5-15% acrylic graft, up to 5% is neutralizing amine plus organic solvent, and 60-80% deionized water.

11. The coating composition of claim 9 wherein the additives are water soluble or dispersible linear or branched polyethylene oxides or polypropylene oxides with a $\overline{Mn}=100-2500$.

12. The coating composition of claim 9 wherein the water soluble or dispersible crosslinker is a methylated melamine formaldehyde resin.

13. An epoxy ester graft acrylic polymer made in accordance with paragraph (a) of claim 1.

14. A process of making an epoxy ester graft acrylic polymer in accordance with paragraph (a) of claim 1.

* * * * *